United States Patent [19]

Woelfel

[11] Patent Number: 5,219,175
[45] Date of Patent: Jun. 15, 1993

[54] MOBILE SUPPORT DEVICE FOR CONCRETE-SPREADING HOSES

[76] Inventor: Lawrence L. Woelfel, R.D. 1, Box 273, Annandale, Minn. 55302

[21] Appl. No.: 877,745

[22] Filed: May 4, 1992

Related U.S. Application Data

[63] Continuation-in-part of Ser. No. 706,340, May 28, 1991, abandoned.

[51] Int. Cl.⁵ .............................................. B62B 1/26
[52] U.S. Cl. ............................. 280/47.131; 280/79.6; 239/726; 248/75
[58] Field of Search ............... 280/79.4, 79.6, 31, 280/32, 47.131, 47.24, 47.26, 47.34, 47.36, 87.021, 63; 410/47, 48, 49, 50, 51; 169/25; 248/75, 80; 239/726

[56] References Cited

U.S. PATENT DOCUMENTS

| | | | |
|---|---|---|---|
| 664,240 | 12/1900 | Doehring | 280/47.131 X |
| 1,175,312 | 3/1916 | Simpson | 280/47.34 |
| 1,343,650 | 6/1920 | Snyder | 280/79.4 X |
| 2,246,882 | 6/1941 | Gentry | 280/79.4 X |
| 2,550,219 | 4/1951 | Bollinger | 280/47.131 X |
| 3,013,807 | 12/1961 | Winterhoff | 280/79.6 |
| 4,921,264 | 5/1990 | Duffy | 280/47.36 X |
| 5,018,930 | 5/1991 | Hardin et al. | 280/47.26 X |

FOREIGN PATENT DOCUMENTS

| | | | |
|---|---|---|---|
| 0118545 | 3/1901 | Fed. Rep. of Germany | 239/726 |
| 2030524 | 12/1971 | Fed. Rep. of Germany | 280/47.23 |

Primary Examiner—Brian Johnson
Attorney, Agent, or Firm—Herman H. Bains

[57] ABSTRACT

A mobile support device for supporting a concrete-spreading hose includes a single piece support structure formed of rigid metal and including a pair of wheel attachment members and a central U-shaped hose supporting member. Longitudinally offset caster wheel assemblies are secured to the wheel support members. The U-shaped hose supporting member supports a concrete-spreading hose therein and extends downwardly below the rotational axes of the caster wheel assemblies thereby imparting a stabilizing low center of gravity to the mobile support device. A keeper element releasably locks the supported concrete-spreading hose in the U-shaped hose supporting member, and handle engaging elements on the mobile support device facilitates manual movement thereof by a worker manipulated hand tool.

7 Claims, 1 Drawing Sheet

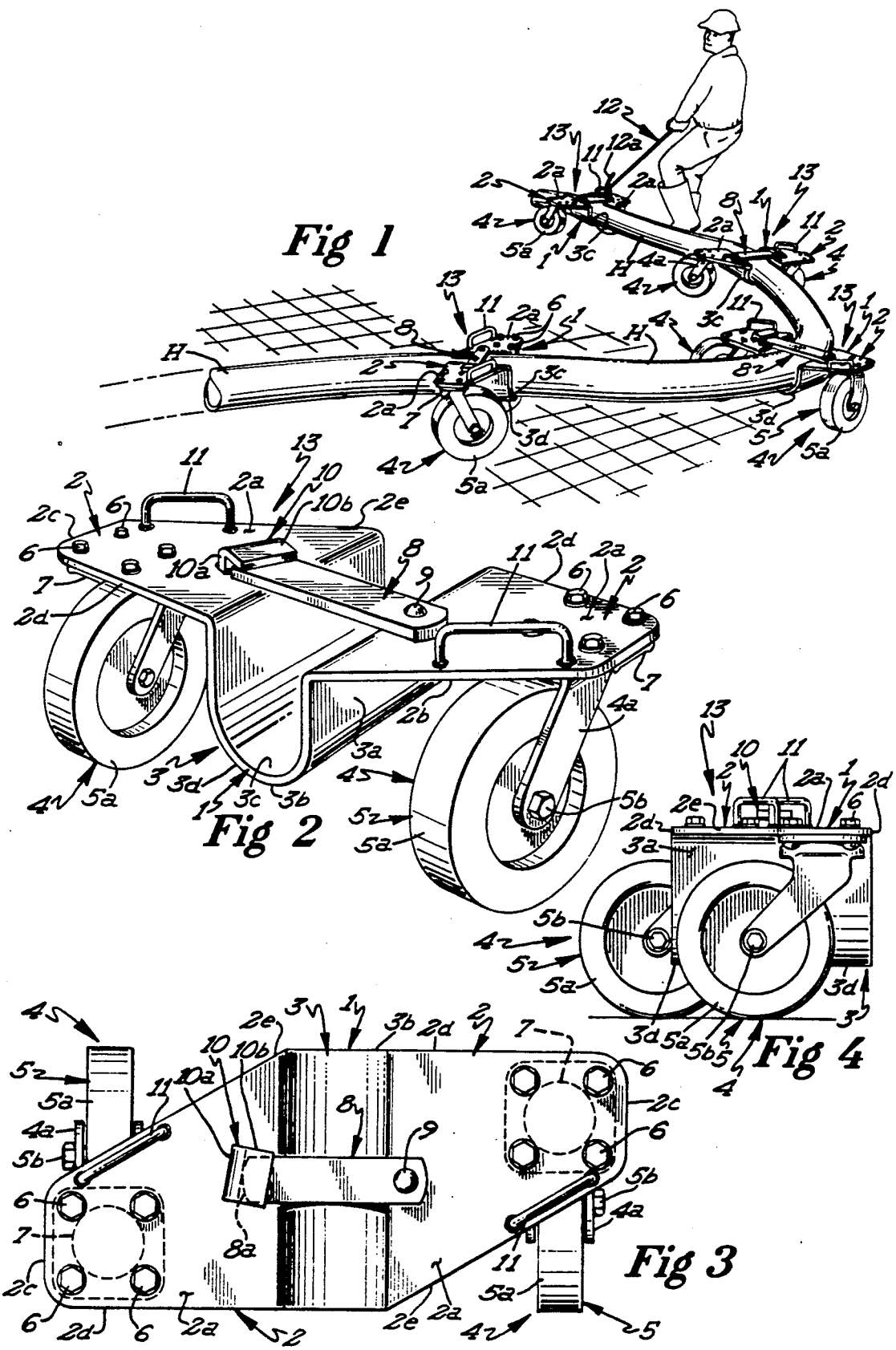

5,219,175

MOBILE SUPPORT DEVICE FOR CONCRETE-SPREADING HOSES

FIELD OF THE INVENTION

This invention relates to a mobile support device for supporting and moving concrete-spreading hoses and is a continuation-in-part application of application Ser. No. 07/706,340 filed May 28, 1991, entitled DEVICE FOR MOVING CONCRETE-SPREADING HOSES and now abandoned.

BACKGROUND OF THE INVENTION

In the construction of large structures, including large buildings and the like, it is necessary to pour concrete at a location remote from the source (truck, hopper, etc.) of the concrete. Some sites are at or below ground level, and other sites are located at elevations substantially above ground level. For example, in the construction of a multi-floored building, concrete is delivered to upper floors by heavy duty flexible hoses. Pumps provide pressure for delivering the viscous concrete to the specific locations. The concrete is spread over metallic decks having ribs and reinforcing rods and the concrete-spreading hose must be moved from time to time to efficiently spread the concrete over the steel deck. At other sites, concrete is spread over plywood docks, slab on grade or on the ground surface.

Although the size of the delivery hoses may vary over a relatively wide range (for example from three inch to six inch diameter), five inch diameter hoses are used extensively at construction sites. A 10 foot length of five inch diameter hose filled with wet concrete weighs approximately 200 pounds. The present practice involves the movement of hoses by workers through the use of lengths of rope (4 to 5 lengths) tied to the hose or the use of an elongate hose engaging tool which permits the workers to manually move the hose. Obviously, manual movement of these heavy hoses is laborous and requires substantial effort by the workers. Although there are presently no mobile devices for supporting concrete delivery hoses to facilitate movement of these hoses, U.S. Pat. No. 666,240 to Doehring discloses a hose truck for supporting garden hoses, fire hoses and the like. The Doehring device is actually a mobile coupling for interconnecting two separate hoses (rigid pipe and flexible hose) and is not designed structurally or functionally to effectively support concrete-spreading hoses.

SUMMARY OF THE INVENTION

It is an object of this invention to provide a mobile support device, of simple and inexpensive construction, for use in supporting a flexible hose used to spread concrete.

A more specific object of this invention is the provision of a mobile support device for a concrete-spreading hose which includes a U-shaped hose support member having a low center of gravity for imparting stability against tipping to the device.

The mobile hose support device includes a one piece body including outer wheel attachment members each having a caster wheel assembly secured thereto. The body also includes a centrally located, upwardly opening, U-shaped hose supporting member. The web portion of the hose supporting member is located substantially below the plane of the wheel attachment portions to thereby impart a low center of gravity to the support device. This particular design stabilizes the hose support device and diminishes the tipping movement of the device. A keeper is provided for releasably retaining a concrete-spreading hose in the U-shaped supporting member of the support device. Each wheel attachment member has a U-shaped element thereon for engagement by a pulling tool applied by workers.

FIGURES OF THE DRAWING

FIG. 1 is a perspective view illustrating a plurality of the mobile support devices in supporting relation in respect to a concrete-spreading hose;

FIG. 2 is an enlarged perspective view of the mobile support device;

FIG. 3 is a top plan view of the mobile support device and;

FIG. 4 is a side elevational view of the mobile support device.

DESCRIPTION OF THE PREFERRED EMBODIMENT

Referring now to the drawings and more specifically to FIG. 2, it will be seen that one embodiment of my novel mobile hose support device, designated generally by the reference numeral 13, is thereshown. The mobile hose support device 13 includes a rigid body 1 comprising a pair of similar outer wheel attachment members 2 which can be rigidly secured to a central U-shaped hose supporting member 3 by welding. The rigid structure 1 may also be formed from a single blank of material in a stamping operation as shown. In the embodiment shown, the outer wheel attachment members 2 are disposed in a single horizontal plane and each includes a substantially planar upper surface 2a and a substantially planar lower surface 2b. Each outer wheel attachment member 2 also has a straight longitudinal edge 2c which is disposed in substantially parallel relation to the longitudinal edge 2c of the other attachment member. Each wheel attachment member also has a substantially straight transverse edge 2d which is disposed in substantially right angular relation with respect to the associated longitudinal edge 2c. Each wheel attachment member 2 further includes an oblique transverse edge 2e which is angularly disposed with respect to the straight transverse edge 2d. It will be noted that the intersecting corners between the transverse edges and the longitudinal edge of each wheel attachment member is rounded to minimize injury to workers.

The central hose supporting member 3 of the single piece body 1 includes a pair of transversely spaced apart vertical wall portions 3a which are interconnected together at their lower ends by web portion 3b. The web portion 3b has an upper surface 3c and a lower surface 3d. Referring now to FIG. 3, it will be seen that the transverse edges of the U-shaped hose supporting member 3 are disposed co-extensively with the straight transverse edges 2d of the wheel attachment members 2.

The mobile hose support device 13 is also provided with a pair of caster wheel assemblies 4 each being secured to one of the outer wheel attachment members 2 and depending therefrom. In the embodiment shown, each caster wheel assembly 4 includes a U-shaped mounting yoke 4a having a bearing mechanism 7 at its upper end defining a vertical pivot about which the caster wheel assembly rotates. The bearing mechanism 7 is secured to the lower surface of the associated outer wheel attachment member 2 by suitable nut and bolt assemblies 6.

Each caster wheel assembly also includes a wheel 5 having a pneumatic tire 5a mounted thereon and secured to the U-shaped mounting yoke by a nut and bolt assembly 5b. The nut and bolt assembly 5b journals the wheel 5 thereon to thereby define the axis of rotation of the caster wheel.

Referring again to FIG. 3, it will be noted that the caster wheel assemblies 4 are longitudinally offset with respect to each other. This offset arrangement is desirable since the concrete is poured on a deck (FIG. 1) and includes ribs and reinforcing rods which the caster wheels must traverse when the mobile hose support device is being moved. By offsetting the wheels, the chances of both wheels being disposed in recesses is substantially minimized which facilitates moving a hose-loaded support device.

The concrete-spreading hose H will be positioned in and supported by the upwardly facing U-shaped hose supporting member 3 during use of the mobile hose support device. Means are provided for retaining the concrete-spreading hose in seated relation within the U-shaped member. This means includes an elongate substantially flat, straight keeper bar 8 which is pivotally connected at one end thereof to the upper surface of one of the wheel attachment members 2 by vertical pivot 9 which allows horizontal swinging movement of the keeper bar 8.

An L-shaped retainer bracket 10 is welded to the upper surface of the other wheel attachment member 2 and includes a vertical leg 10a and a horizontal leg 10b. It will be noted that the outer end 8a of the keeper bar 8 is curved to permit the keeper bar to engage the vertical edge 10a of the L-shaped bracket with wedging effect when the keeper bar is in a locked or retaining position. When it is desirable to remove a hose from supported relation on the U-shaped member, a worker will strike the keeper bar with a hammer to disengage the keeper bar from wedged relation with respect to the L-shaped retaining bracket 10.

Each of the wheel attachment members 2 has a U-shaped handle element 11 welded thereto and projecting upwardly therefrom. It will be noted that the U-shaped handle elements 11 are each disposed substantially parallel to and closely adjacent to the oblique transverse edge 2e of one of the wheel attachment members adjacent the longitudinal edge 2c thereof. These U-shaped handle elements serve as a convenient handle for grasping by a worker when moving the device 13, loaded or unloaded, to a new location. The handle elements 11 may also be gripped by the hooked portion 12a of an elongate T-handle 12 which are used by workers in moving the hose support devices 13 from one location to another. The hook portion 12a of these T-shaped handles is used to engage the hose H to permit hose to be moved.

In use, when the concrete-spreading hose H is used to deliver concrete to a site, the hose will be connected to a hopper or other source containing concrete. Suitable pumps will be provided for pumping the concrete to the desired location. The hose H will be positioned in the U-shaped hose supporting members of a plurality of a mobile hose supporting devices 13 (FIG. 1) and the keeper bar 8 will be moved to the locked or retaining position. As concrete is discharged from the hose H, it will be necessary to move the hose from time to time to efficiently spread the concrete over the deck. The hose H will be moved by a worker with a T-rod handle 12 to cause movement of the mobile support device and supported hose H to a new location. The mobile support device 13 may also be engaged by the T-handles during discharge of the concrete to minimize any tendency of the hose to whip and recoil (reaction force).

In the embodiment shown, the upper surface 3c of the web portion 3b of the U-shaped member 3 is disposed below the rotational axis 5b of the caster wheels 5. When a concrete loaded hose H is positioned in the U-shaped member 3, the low center of gravity of the loaded mobile hose support device 13 diminishes the tipping moment of the device and provides an extremely stable structure which can be readily moved by workers.

From the foregoing description, it will be seen that I have provided a mobile support device for supporting a concrete-spreading hose which functions in a more efficient manner than any heretofore known comparable device.

What is claimed is:

1. A mobile support device for supporting a concrete-spreading hose at a building site to permit ready movement of the hose during a concrete spreading operation, comprising, a unitary support structure formed of rigid metal including a pair of substantially planar outer wheel attachment members and an upwardly opening centrally located U-shaped hose supporting member, said wheel support members having upper and lower surfaces, a pair of caster wheel assemblies each including a caster wheel having a horizontal rotational axis, pivot means pivotally connecting each caster wheel assembly to the lower surface of one of said outer wheel attachment members to permit pivotal movement of each caster wheel about a substantially vertical axis, said U-shaped hose supporting member including a pair of vertical wall portions and a central web portion, said vertical wall portions being integral with said outer wheel support members, and said web portion being disposed at a level substantially below the lower surface of the wheel attachment members, said U-shaped member being shaped and sized, for supporting a concrete-spreading hose completely therein to permit a concrete-spreading hose to be readily positioned in and removed from said U-shaped member, a keeper element shiftably mounted on one of said wheel attachment members and being shiftable between a hose locking and a hose release position, a keeper retaining element on the other of said wheel attachment members for releasably retaining the keeper element in the locking position, wherein said keeper element comprises an elongate bar having one end thereof pivotally connected to the upper surface of one of said wheel attachment members for horizontal pivotal movement about a vertical axis between the locking and release positions.

2. The mobile support device as defined in claim 1 wherein the central web portion of said U-shaped hose supporting member has an upper hose engaging surface positioned below the rotational axes of said caster wheels.

3. The mobile support device as defined in claim 1 wherein a concrete-spreading hose seated in said U- shaped hose supporting member is positioned below the upper surface of each wheel attachment member.

4. The mobile support device as defined in claim 1 wherein said unitary support structure has opposed, substantially parallel longitudinal edges, each longitudinal edge defining an outer longitudinal edge of one of said wheel attachment members, said pivotal axes of said caster wheel assemblies being longitudinally offset with respect to each other.

5. The mobile support device as defined in claim 1 and handle means on one of said wheel attachment members and for facilitating movement of said mobile support device.

6. The mobile support device as defined in claim 1 wherein each of said caster wheels has a pneumatic tire mounted thereon.

7. The mobile support device as defined in claim 5 wherein said handle means comprises a U-shaped element secured to said wheel attachments member and projecting upwardly therefrom.

* * * * *